US010118592B2

(12) United States Patent
Boran et al.

(10) Patent No.: US 10,118,592 B2
(45) Date of Patent: Nov. 6, 2018

(54) DIAGNOSTIC PORT PROTECTION TO BODY CONTROL MODULE

(71) Applicant: FORD GLOBAL TECHNOLOGIES, LLC, Dearborn, MI (US)

(72) Inventors: Lisa Therese Boran, Northville, MI (US); Brunilda B. Caushi, Northville, MI (US); Simon John William Hurr, Swadlincote (GB); James Michael Weinfurther, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 15/049,877

(22) Filed: Feb. 22, 2016

(65) Prior Publication Data

US 2017/0036645 A1 Feb. 9, 2017

Related U.S. Application Data

(60) Provisional application No. 62/201,018, filed on Aug. 4, 2015.

(51) Int. Cl.
*B60R 25/20* (2013.01)
*B60R 16/023* (2006.01)
*B60R 25/24* (2013.01)
*G07C 5/08* (2006.01)

(52) U.S. Cl.
CPC ............ *B60R 25/24* (2013.01); *G07C 5/0808* (2013.01)

(58) Field of Classification Search
CPC ............................ B60R 25/24; G07C 5/0808
See application file for complete search history.

(56) References Cited

U.S. PATENT DOCUMENTS

| 5,654,688 | A  | * | 8/1997 | Allen   | B60R 25/04  |
|           |    |   |        |         | 340/426.14  |
| 7,340,331 | B2 | * | 3/2008 | Welch   | G07C 5/0808 |
|           |    |   |        |         | 701/33.4    |
| 7,945,207 | B1 | * | 5/2011 | Hermes  | H04Q 9/00   |
|           |    |   |        |         | 455/3.03    |
| 8,412,406 | B2 | * | 4/2013 | Johnson | G07C 5/008  |
|           |    |   |        |         | 701/33.1    |

(Continued)

FOREIGN PATENT DOCUMENTS

EP    2547061 A1      1/2013
JP    4404054 B2  *  1/2010

(Continued)

*Primary Examiner* — Tuan C To
(74) *Attorney, Agent, or Firm* — Franklin A. MacKenzie; Brooks Kushman P.C.

(57) ABSTRACT

A body controller may monitor a vehicle bus for diagnostic requests received from a scan device connected to a diagnostic port when a vehicle perimeter alarm of a body controller is armed. The body controller may reset a predetermined lockout timeout responsive to receipt of a session request from the scan device. Upon expiration of the lockout timeout, the body controller may request to establish the session with the body controller from the scan device for a predetermined access timeout. When the session is established, the body controller may allow a user to program entry devices to the body controller and/or download software updates to the body controller.

20 Claims, 3 Drawing Sheets

(56) References Cited

U.S. PATENT DOCUMENTS

| | | | | |
|---|---|---|---|---|
| 8,718,905 | B2 * | 5/2014 | Mosher | F02D 28/00 |
| | | | | 701/101 |
| 9,162,648 | B1 * | 10/2015 | Weng | B60R 25/24 |
| 9,296,267 | B2 * | 3/2016 | McIntyre | B60C 23/0471 |
| 9,513,789 | B2 * | 12/2016 | Marshall | G07C 5/0808 |
| 2004/0017284 | A1 * | 1/2004 | Flick | B60R 25/04 |
| | | | | 340/426.1 |
| 2005/0057256 | A1 * | 3/2005 | Bertness | G01R 1/06 |
| | | | | 324/426 |
| 2007/0093947 | A1 * | 4/2007 | Gould | G07C 5/008 |
| | | | | 701/31.5 |
| 2007/0152503 | A1 * | 7/2007 | Kowalick | H01R 13/6397 |
| | | | | 307/10.1 |
| 2007/0262853 | A1 * | 11/2007 | Bradus | B60R 25/1004 |
| | | | | 340/426.25 |
| 2008/0059017 | A1 * | 3/2008 | Thor | F16H 61/12 |
| | | | | 701/29.2 |
| 2011/0071724 | A1 | 3/2011 | Heine et al. | |
| 2014/0152828 | A1 * | 6/2014 | Plante | B60R 16/03 |
| | | | | 348/148 |
| 2015/0105972 | A1 * | 4/2015 | Madison | G07C 5/085 |
| | | | | 701/33.2 |
| 2015/0113638 | A1 | 4/2015 | Valasek et al. | |
| 2015/0191135 | A1 | 7/2015 | Ben Noon et al. | |

FOREIGN PATENT DOCUMENTS

| | | | | |
|---|---|---|---|---|
| KR | 100972077 B1 * | 7/2010 | | G01D 5/24461 |
| RU | 2373324 C1 * | 11/2009 | | |

* cited by examiner

DIAGNOSTIC PORT PROTECTION TO BODY CONTROL MODULE

CROSS-REFERENCE TO RELATED APPLICATIONS

This application claims the benefit of U.S. provisional application Ser. No. 62/201,018 filed Aug. 4, 2015, the disclosure of which is hereby incorporated in its entirety by reference herein.

TECHNICAL FIELD

Aspects of the disclosure generally relates to diagnostic port protection for a body control module of a vehicle.

BACKGROUND

On-board diagnostic ports provide an interface whereby entities, such as dealers, mechanics, and third parties (such as insurance companies), can plug devices into a vehicle to access information on a vehicle bus.

SUMMARY

In an illustrative embodiment, a system includes a diagnostic port configured to provide access to a vehicle bus of a vehicle; and a body controller of the vehicle connected to the vehicle bus, programmed to, upon a vehicle perimeter alarm being armed: monitor the vehicle bus for requests received from a scan device connected to the diagnostic port; reset a predetermined lockout timeout responsive to receipt of a session request from the scan device; and upon expiration of the lockout timeout, allow, for a predetermined access window, a request to establish the session with the body controller from the scan device.

In another illustrative embodiment, a method includes monitoring a vehicle bus for diagnostic requests received from a scan device connected to a diagnostic port when a vehicle perimeter alarm of a body controller is armed; resetting a predetermined lockout timeout responsive to receipt of a session request from the scan device; and upon expiration of the lockout timeout, allowing for a predetermined access window a request to establish the session with the body controller from the scan device.

In a further illustrative embodiment, a vehicle includes a controller programmed to, while a vehicle perimeter alarm of a vehicle controller is armed and in response to a request from a diagnostic device to establish a session with a vehicle controller, prevent establishment of the session for a lockout period initiated upon receipt of the request, and in response to expiration of the lockout period, allow a second request for establishment of the session during a predetermined access time.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
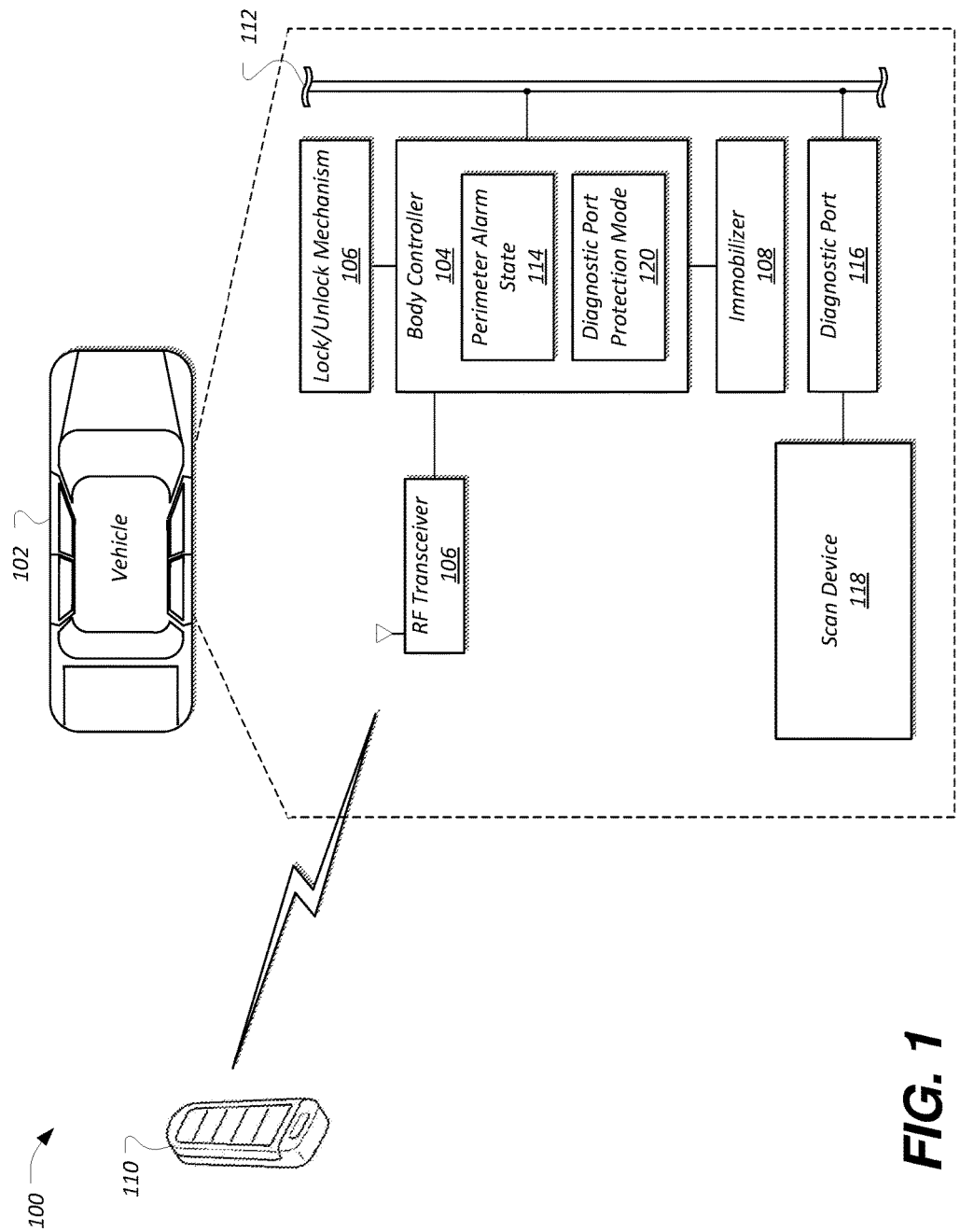
FIG. 1 illustrates an example system for a vehicle having a body controller implementing a diagnostic port protection mode.

FIG. 1 illustrates an example system 100 for a vehicle 102 having a body controller 104 implementing a diagnostic port protection mode 120. Sometimes referred to as a body control module (BCM), the body controller 104 of the vehicle 102 may include one or more electronic control units managing access or other functions related to the body of the vehicle 102. As an example, the body controller 104 may control locking and unlocking of vehicle doors using an unlock/lock mechanism 106 coupled to the body controller 104. As another example, the body controller 104 may enable or disable a vehicle immobilizer 108 system configured to immobilize the vehicle 102. As some other examples, the body controller 104 may perform perimeter alarm detection and alerts, and association and authentication of remote keyless entry (RKE) 110 devices such as key fobs with the vehicle 102.

The body controller 104 may communicate with other vehicle systems over a vehicle bus 112, such as a controller-area network (CAN) bus. In an example, when the body controller 104 receives an indication, e.g., via an RF transceiver 107, to lock the vehicle from a RKE 110 programmed to the body controller 104, the body controller 104 may direct the vehicle 102 to enter a perimeter alarm state 114 of armed. When entering the armed perimeter alarm state 114, the body controller 104 may direct the unlock/lock mechanism 106 to lock the vehicle doors, activate the vehicle immobilizer 108 to prevent the vehicle 102 from entering motive mode (in some implementations), and provide an indication to the user of the armed status, such as by chirping the vehicle horn (not shown) and/or flashing the vehicle lights (not shown).

The vehicle 102 is also equipped with a diagnostic port 116. In an example, the diagnostic port 116 may be an on-board diagnostics (OBD) port connected to the vehicle bus 112. A user may connect a dongle, code reader, or other scan device 118 to the diagnostic port 116, and may use the connection provided by the diagnostic port 116 to gain access to messages traversing the vehicle bus 112. Once connected, a user may utilize the connected scan device 118 to capture diagnostic codes, monitor vehicle health, or, in some cases, adjust vehicle settings.

When the vehicle 102 is in the armed perimeter alarm state 114, the body controller 104 may implement a diagnostic port protection mode 120 to protect access to the body controller 104 from the diagnostic port 116. In an example, if a malicious user attempts to tap into the diagnostic port 116 and attempts to invoke a diagnostic session to place the body controller 104 into programming mode or extended diagnostics mode, the diagnostic port protection mode 120 may trigger an alarm. Once triggered, the body controller 104 may lock out access to invoking diagnostic sessions for a predetermined lockout period of time (e.g., a predetermined lockout timeout period of ten minutes). After the lockout timeout period has elapsed, the diagnostic port protection mode 120 may trigger an access window during which the body controller 104 may be transitioned into the extended diagnostics mode for a period of time (e.g., a one minute access period).

To inform a technician or other user that the access window is open, the body controller 104 may chirp the vehicle horn. For instance, the body controller 104 may chirp the horn using the traffic horn sound, using the security horn sound, using a combination of those sounds or another horn sound. Additionally or alternately, the body controller 104 may flash the vehicle lights to indicate that the access window is open. As yet another possibility, the body controller 104 may additionally or alternately implement a diagnostic control command implementing a countdown to give information to a user of the scan device 118 when the access window will open.

While the access window is open, the body controller 104 may allow the user to attempt to establish a session with the body controller 104, e.g., to enter into the extended diagnostics mode or the programming mode. If the body controller 104 is successfully transitioned into the session during the access window, the connected scan device 118 may utilize session of the body controller 104 without the body controller 104 imposing additional lockouts or timeouts. If however, the body controller 104 is not successfully transitioned into a session such as programming mode or extended diagnostics mode during the access window (or if no attempt is made to do so during the access window), the body controller 104 stays within the diagnostic port protection mode 120, such that additional attempts to access the body controller 104 to establish a session again trigger the lockout timeout period of time.

If the body controller 104 is successfully transitioned during the access window into a session such as the extended diagnostics mode, and is later transitioned out of the session, if the perimeter alarm state 114 is not set to disarmed, the body controller 104 may again return to the diagnostic port protection mode 120.

Figure 2:
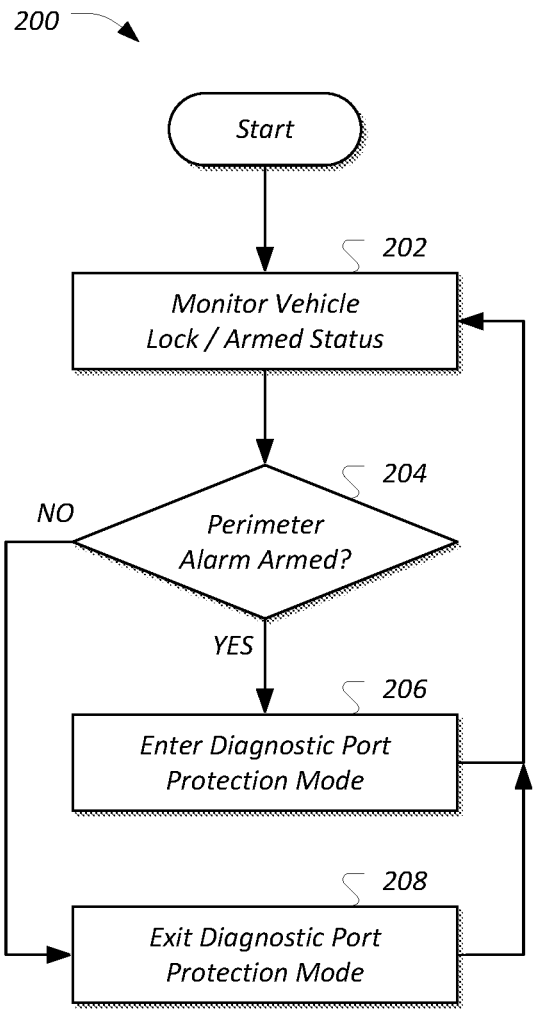
FIG. 2 illustrates an example process for entering and exiting the diagnostic port protection mode.

FIG. 2 illustrates an example process 200 for entering and exiting the diagnostic port protection mode 120. The process 200 may be performed, in an example, by the body controller 104 of the vehicle 102.

At operation 202, the body controller 104 monitors the vehicle lock status and perimeter alarm state 114. In an example, the body controller 104 may monitor whether lock or unlock buttons on the RKE 110 were pressed by a user (e.g., via signal received from the RF transceiver 107). In another example, the body controller 104 may monitor whether input is received to an exterior keypad of the vehicle 102 indicating to lock or unlock the vehicle 102. In yet a further example, the body controller 104 may monitor door lock controls of the vehicle 102 to determine whether they have been changed to a locked or unlocked position and/or monitor whether front doors of the vehicle have been opened or closed. In a still further example, the body controller 104 may monitor whether a passive entry system of the vehicle 102 indicates that the vehicle 102 is to be locked or unlocked.

At operation 204, the body controller 104 determines whether to set the perimeter alarm state 114 to armed or disarmed. For instance, the body controller 104 may set the perimeter alarm state 114 to armed responsive to one or more of: (i) pressing a lock button on the RKE 110, (ii) setting a door lock control to a lock position with a front door open followed by closing of the front door, (iii) inputting a vehicle lock action to a vehicle keyless entry keypad, or (iv) locking the vehicle using a passive entry feature of the vehicle. Or, the body controller 104 may set the perimeter alarm state 114 to disarmed responsive to one or more of: (i) pressing an unlock button on a door lock control within a predetermined pre-arm timeout, (ii) pressing an unlock button on the RKE 110, (iii) pressing a luggage compartment lid release button on a remote keyless entry device, (iv) using a key programmed to the body controller to change the ignition to run, (v) inputting a vehicle unlock code to a vehicle keyless entry keypad, or (vi) unlocking a front door or a luggage compartment lid using a passive entry feature of the vehicle. Other possibilities may be used as well, such as to arm or disarm the vehicle 102 using a mobile phone connection e.g., via a My Ford/Lincoln application, or using a mechanical key in the driver door cylinder (if a set switch is installed). If the perimeter alarm state 114 is set to armed, control passes to operation 206. Otherwise, control passes to operation 208.

At operation 206, the diagnostic port protection mode 120 is activated. Further details of the diagnostic port protection mode 120 are described below with reference to FIG. 3. After operation 206, control may pass to operation 202.

At operation 208, the diagnostic port protection mode 120 is deactivated. When the diagnostic port protection mode 120 is deactivated, the connected scan device 118 may utilize the body controller 104 without the additional protections of the diagnostic port protection mode 120. After operation 208, control may pass to operation 202.

Figure 3:
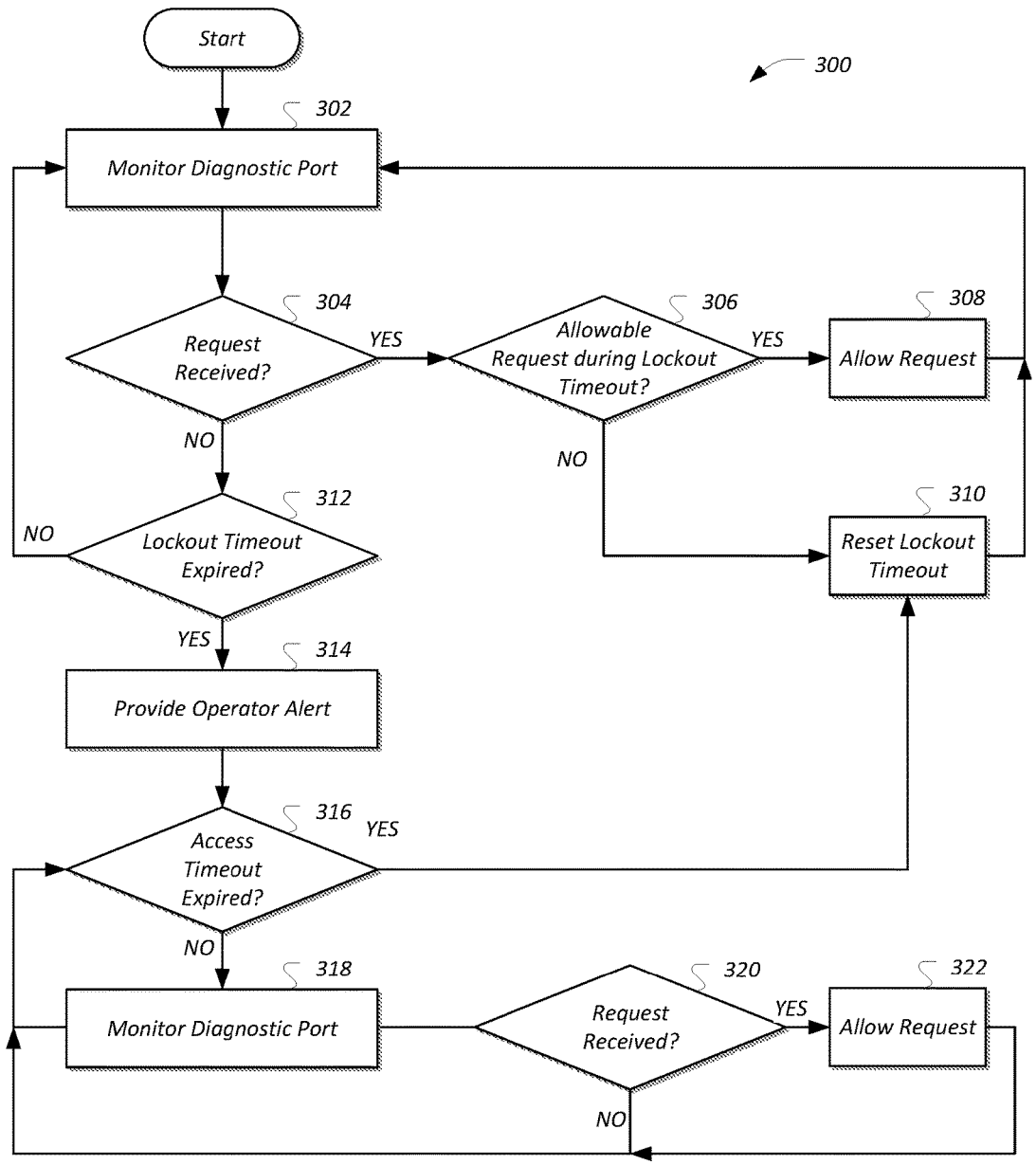
FIG. 3 illustrates an example process for establishing sessions with the body controller when the body controller is in the diagnostic port protection mode.

FIG. 3 illustrates an example process 300 for establishing sessions with the body controller 104 when the body controller 104 is in the diagnostic port protection mode 120. As with the process 200, the process 300 may be performed by the body controller 104 of the vehicle 102.

At operation 302, the body controller 104 monitors the diagnostic port 116. In an example, the body controller 104 monitor the vehicle bus 112 for traffic from the scan device 118 connected to the diagnostic port 116 of the vehicle 102.

At operation 304, the body controller 104 determines whether a request is received. In an example, if at operation 302 the body controller 104 identified a session request from the scan device 118, control passes to operation 306. Otherwise, control passes to operation 312.

At operation 306, the body controller 104 determines whether the request is allowable. For example, if the request is for a service or services that are included in OBD diagnostic default session 1, then the request may be allowed. As some examples, allowable requests may include Read DIDs, Read DTCs, and/or Clear DTCs. If the request is allowable, control passes to operation 308. Otherwise control passes to operation 310.

At operation 308, the body controller 104 allows the request. After operation 308, control passes to operation 302.

At operation 310, the body controller 104 resets the lockout timeout. In contrast to operation 308, at operation 310 the request is not allowed. Moreover, during the lockout timeout the body controller 104 may lock out certain requests for the lockout timeout period of time, such as those involving access to programming mode, extended diagnostic mode or other operations not allowed according to operation 306 sessions. In one example, the predetermined lockout timeout period may be set to ten minutes. The body controller 104 may further signal the reset of the lockout timeout to the user. In an example, the body controller 104 may activate the perimeter alarm (e.g., to provide thirty seconds of alarm sound and five minutes of flashing of the vehicle 102 lights). After operation 310, control passes to operation 302.

At operation 312, the body controller 104 determines whether the lockout timeout has expired. If the lockout timeout has expired, control passes to operation 314. Otherwise, if the lockout timeout has not expired (e.g., was reset less than the length of the timeout ago), control passes to operation 302.

At operation 314, the body controller 104 provides the operator with an alert. In an example, to inform a technician or other user that the access window is open, the body controller 104 may chirp the vehicle horn. For instance, the body controller 104 may chirp the horn using the traffic horn sound, using the security horn sound, using a combination of those sounds or another horn sound. Additionally or alternately, the body controller 104 may flash the vehicle lights to indicate that the access window is open. As yet another possibility, the body controller 104 may additionally or alternately implement a diagnostic control command implementing a countdown to give information to a user of the scan device 118 when the access window will open.

At operation 316, the body controller 104 determines whether the access timeout has expired. If the access period of time has not elapsed (e.g., since expiration of the lockout timeout), control passes to operation 318. If the period has expired, control may return to operation 302.

At operation 318, the body controller 104 monitors the diagnostic port 116. In an example, and similar to operation 302, the body controller 104 monitors the vehicle bus 112 for traffic from the scan device 118 connected to the diagnostic port 116 of the vehicle 102.

At operation 320, the body controller 104 determines whether a request is received. In an example, if at operation 320 the body controller 104 identified a request from the scan device 118, control passes to operation 322. Otherwise, control passes to operation 316.

At operation 322, the body controller 104 allows the request to proceed, regardless of type of request. As some example, the body controller 104 may allow session requests to cause the body controller 104 to enter into the extended diagnostics mode or the programming mode. For instance, the body controller 104 may be utilized in such a mode to program RKEs 110 to the body controller 104. As another example, the body controller 104 may also allow requests that would be allowed during the lockout timeout.

If the body controller 104 is successfully transitioned into the extended diagnostics mode, the diagnostic port protection mode 120 is disabled, and the connected scan device 118 may utilize session of the body controller 104 without the body controller 104 imposing additional lockouts or timeouts. If however, the body controller 104 is not successfully transitioned into a session during the access window, the body controller 104 stays within the diagnostic port protection mode 120, such that additional attempts to access the body controller 104 to establish a session again trigger the lockout timeout period of time.

After operation 322, control passes to operation 316. Notably, if the vehicle 102 is still in the diagnostic port protection mode 120 when the session exits, the process 300 may continue, e.g., to operation 302. If the vehicle 102 is no longer in the diagnostic port protection mode 120 such as due to disarming of the perimeter alarm state 114 as discussed above with respect to the process 200, the process 300 ends.

Variations on the system are possible. In an example, DIDs may be implemented by the body controller 104, and may provide messages to the scan device 118 via the vehicle bus 112 to allow a user of the scan device 118 to keep track of the timeouts and be able to identify how much time is left in the lockout timeout lockout as well as the in the open access window.

Computing devices described herein, such as the body controller 104 and scan device 118, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a diagnostic port configured to provide access to a vehicle bus of a vehicle; and
   a body controller of the vehicle connected to the vehicle bus, programmed to, upon a vehicle perimeter alarm being armed:
   monitor the vehicle bus for requests received from a scan device connected to the diagnostic port;
   reset a predetermined lockout timeout responsive to receipt of a session request from the scan device; and
   upon expiration of the lockout timeout, allow, for a predetermined access window, a request to establish the session with the body controller from the scan device.

2. The system of claim 1, wherein the vehicle perimeter alarm is armed responsive to one or more of: (i) pressing a lock button on a remote keyless entry device, (ii) setting a door lock control to a lock position with a front door open followed by closing of the front door, (iii) inputting a vehicle lock action to a vehicle keyless entry keypad, or (iv) locking the vehicle using a passive entry feature of the vehicle.

3. The system of claim 1, wherein the vehicle perimeter alarm is disarmed responsive to one or more of: (i) pressing an unlock button on a door lock control within a predetermined pre-arm timeout, (ii) pressing an unlock button on a remote keyless entry device, (iii) pressing a luggage compartment lid release button on a remote keyless entry device, (iv) using a key programmed to the body controller to change an ignition state of the vehicle to run, (v) inputting a vehicle unlock code to a vehicle keyless entry keypad, or (vi) unlocking a front door or a luggage compartment lid using a passive entry feature of the vehicle.

4. The system of claim 1, wherein the session is a programming session request or an extended diagnostic session request.

5. The system of claim 4, wherein, when the session is established, the body controller allows one or more of: (i) entry devices to be programmed to the body controller or (ii) software updates to be downloaded to the body controller.

6. The system of claim 1, wherein the predetermined lockout timeout is ten minutes, and the predetermined access timeout is one minute.

7. A method comprising:
upon expiration of a lockout period initiated in response to receiving a session request from a scan device while a vehicle perimeter alarm of a vehicle controller is armed and during which, sessions between the scan device and vehicle controller are prohibited, permitting by the vehicle controller, for a predetermined access time, another session request from the scan device to establish a session between the scan device and vehicle controller.

8. The method of claim 7 further comprising resetting a predetermined lockout timeout responsive to receipt of a session request from the scan device.

9. The method of claim 8, wherein the session request is a diagnostic request attempting to enter an elevated diagnostic mode.

10. The method of claim 9, wherein the elevated diagnostic mode is a programming mode.

11. The method of claim 9, wherein the elevated diagnostic mode is an enhanced diagnostic mode.

12. The method of claim 9 further comprising, requesting credentials required in order to access to the elevated diagnostic mode.

13. The method of claim 9, wherein the lockout period is ten minutes, and the predetermined access time is one minute.

14. A vehicle comprising:
a vehicle controller programmed to, while a vehicle perimeter alarm of the vehicle controller is armed and in response to a request from a diagnostic device to establish a session with the vehicle controller, prevent establishment of the session for a lockout period initiated upon receipt of the request, and in response to expiration of the lockout period, allow a second request for establishment of the session during a predetermined access time.

15. The vehicle of claim 14, wherein the controller is further programmed to reset the lockout period when an additional request from the diagnostic device to establish the session occurs during the lockout period.

16. The vehicle of claim 14, wherein the controller is further programmed to prevent establishment of the session when the request is to enter a programming mode or enhanced diagnostics mode.

17. The vehicle of claim 14, wherein the controller is further programmed to prevent establishment of the session in response to activation of a vehicle alarm system.

18. The vehicle of claim 14, wherein the controller is further configured to initiate an alarm when the request occurs during the lockout period.

19. The vehicle of claim 14, wherein the controller is a body module controller.

20. The vehicle of claim 14, wherein the lockout period is ten minutes, and the predetermined access time is one minute.

* * * * *